Feb. 7, 1961 N. W. CABELL ET AL 2,970,360
APPARATUS FOR HANDLING SEPARATED TILE BODIES
Filed Feb. 4, 1959 4 Sheets-Sheet 1
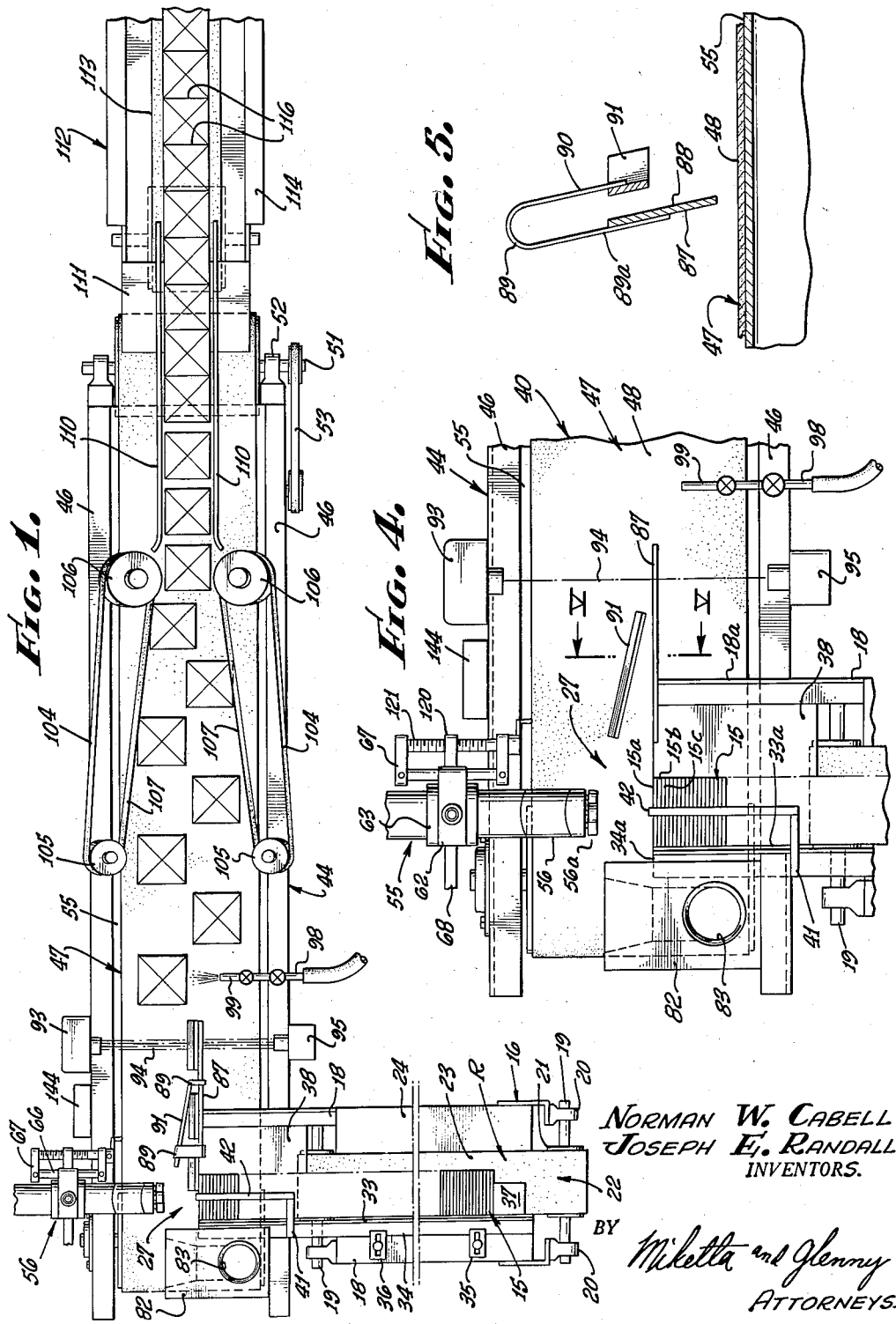
NORMAN W. CABELL
JOSEPH E. RANDALL
INVENTORS.
BY Miketta and Glenny
ATTORNEYS.

Feb. 7, 1961 N. W. CABELL ET AL 2,970,360
APPARATUS FOR HANDLING SEPARATED TILE BODIES
Filed Feb. 4, 1959 4 Sheets-Sheet 2
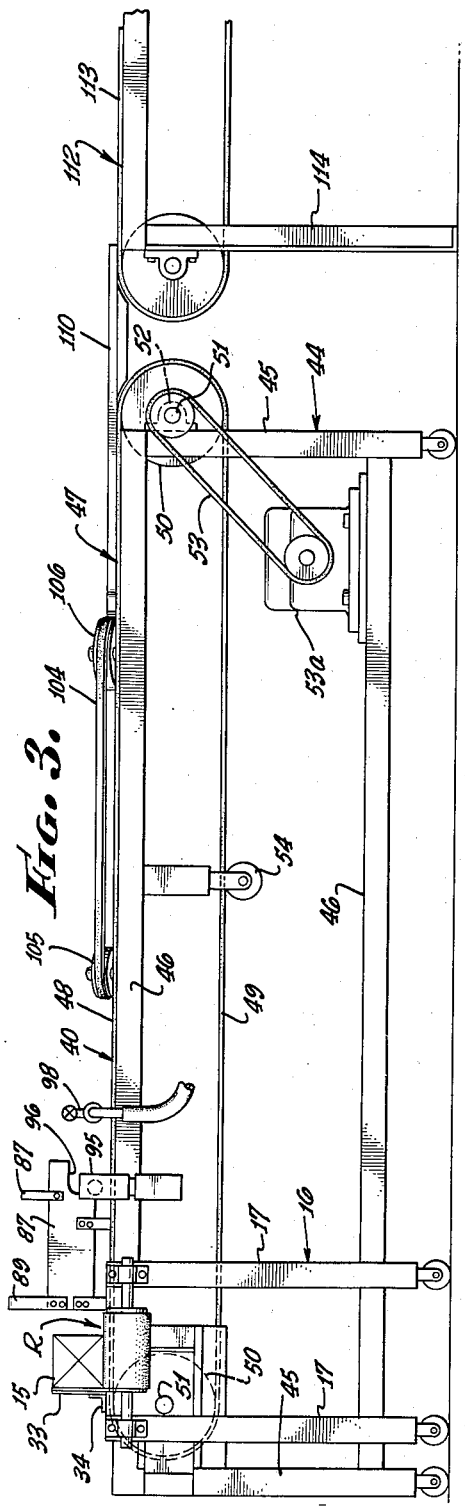
NORMAN W. CABELL
JOSEPH E. RANDALL
INVENTORS.
BY
ATTORNEYS.

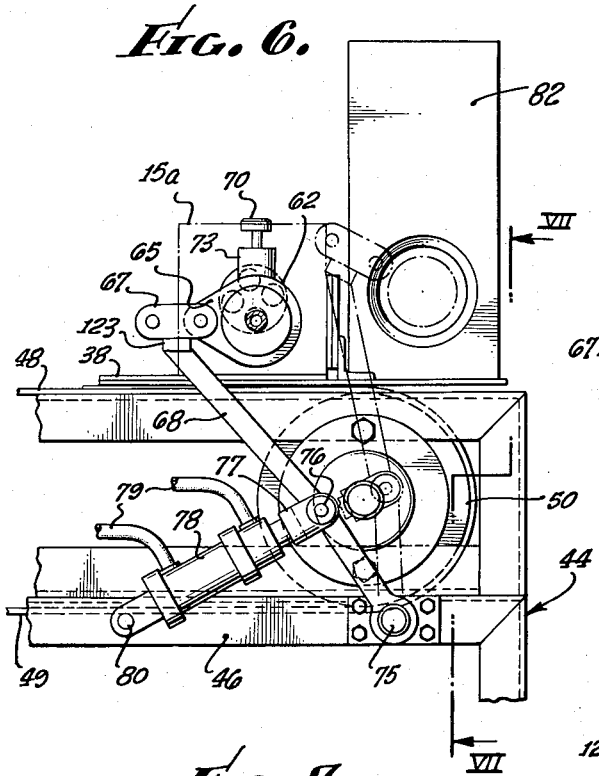
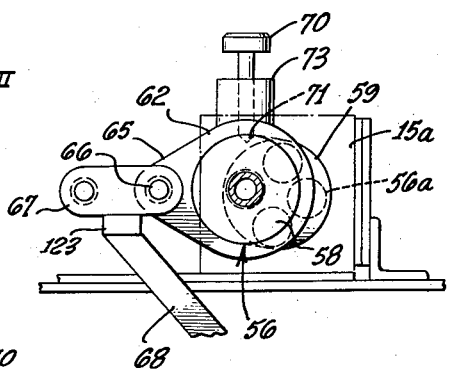
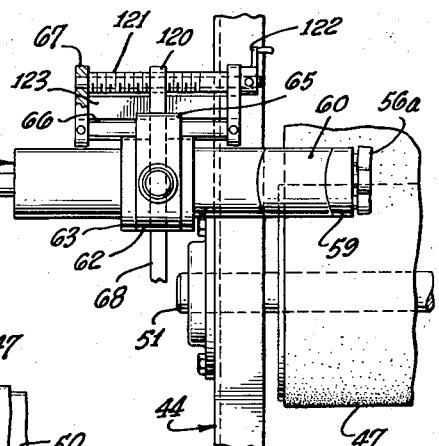
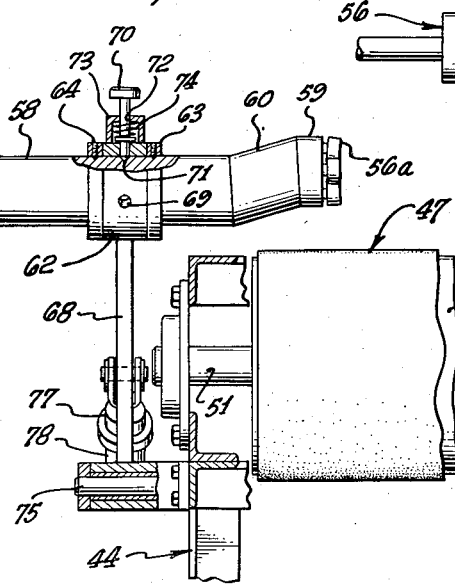

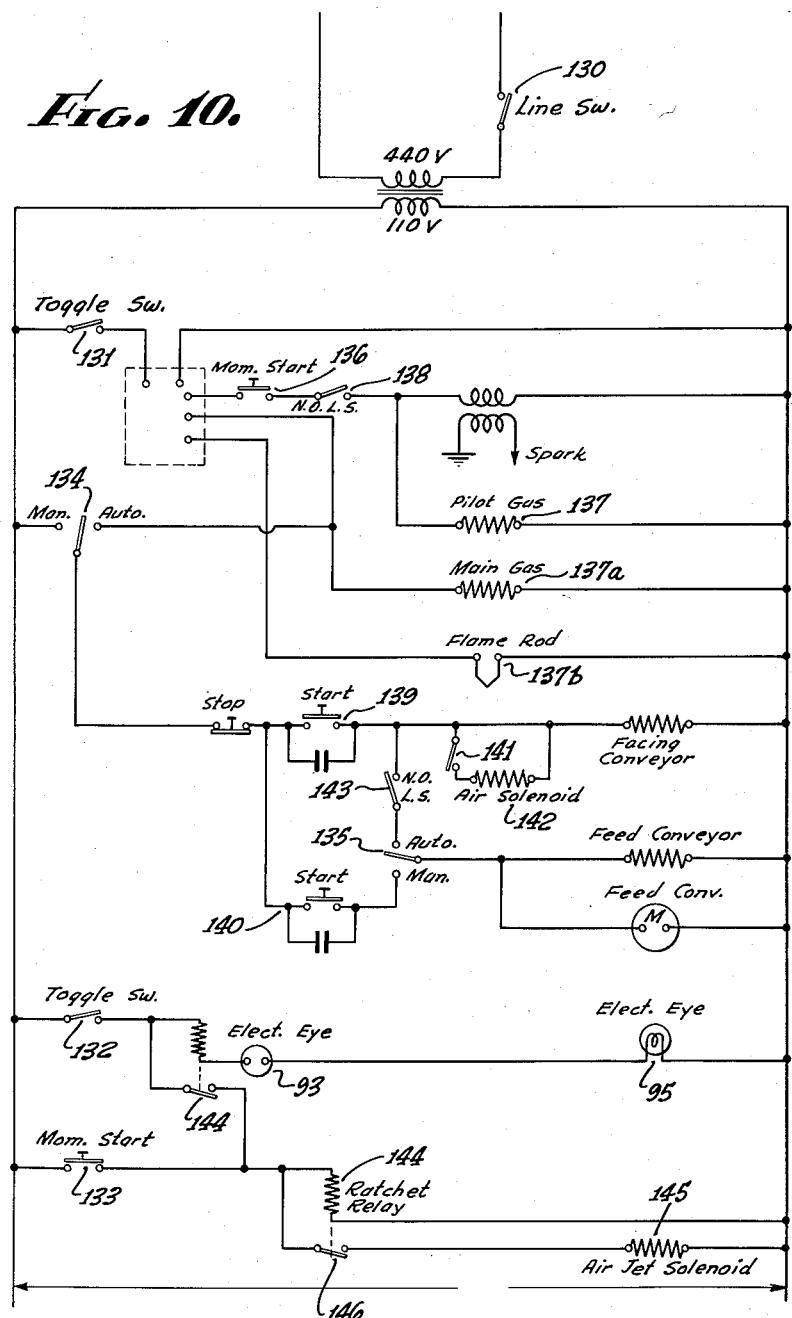

United States Patent Office 2,970,360
Patented Feb. 7, 1961

2,970,360

APPARATUS FOR HANDLING SEPARATED TILE BODIES

Norman W. Cabell, La Crescenta, and Joseph E. Randall, Los Angeles, Calif., assignors to Gladding, McBean & Co., Los Angeles, Calif., a corporation of California Filed Feb. 4, 1959, Ser. No. 791,142

6 Claims. (Cl. 25—2)

This invention relates to the manufacture of ceramic tile and more particularly to an apparatus for rapidly and continuously separating clay composition fired tile bodies in stuck relation and selectively handling each separated tile body so that its front surface is faced upwardly or in a selected direction to receive, for example, a glaze composition to be sprayed thereon.

The apparatus of this invention may utilize a method for separating tile bodies in stuck relation such as described in United States Letters Patent No. 2,829,419, issued April 8, 1958.

In the mass production of ceramic tile, pressed tile bodies of clay composition are often stacked in bungs of a plurality of tile bodies for burning. Each pair of tile is usually placed in face-to-face relation in order to protect the front or decorative surfaces of the tile on which the glaze composition is to be sprayed. Firing of such stacks of tile usually causes nearly all of the pieces of tile to be slightly stuck together; that is, pairs of tile are stuck in face-to-face relation and adjacent pairs of tile in back-to-back relation. Prior methods of separating such clay composition tile bodies included hand "picking" by hand and striking or "ringing" a pair of tile against a flat metal surface. Such steps of "picking" and "ringing" required considerable manual handling and transportation of tile bodies with resultant broken chipped and otherwise damaged tile bodies which were rejected before the tile bodies reached the spray zone for application of a glaze composition. Such prior methods of handling fired tile advanced toward a spray machine also included the manual turning of alternate pieces of tile, or those with back surfaces up, into front face-up position so that each tile would be properly positioned before entering the spray machine conveyor. Handling of tile bodies between a kiln and a spray zone according to prior proposed methods thus required a considerable labor force and considerable manual handling of each tile body.

The apparatus of the present invention may utilize the method described in said Letters Patent No. 2,829,419 and particularly provides means for automatically machine-handling each separated tile in such a manner that it is ultimately disposed with its front surface upwardly directed and in position to receive thereon a glaze composition. The apparatus of the present invention employs a conveyor means for advancing a plurality of fired tile bodies in stuck relation into a separation zone where a burner device is positioned to apply heat to the leading tile body to cause virtually instantaneous heating thereof for differentially expanding the leading tile body with respect to the succeeding tile body. In accordance with the present invention each separated tile body is moved out of the separation zone while standing in an upright position on one edge, and at a selected distance from the separation zone each separated tile is ultimately positioned with its front surface upwardly directed. Since tile fired in face-to-face and back-to-back relation will leave the separation zone with the front faces and back faces in alternate relation as viewed from one side of the apparatus, means are provided for permitting certain tile to fall in one direction and for permitting other tile in alternate relation to fall in the other direction so that all of the front surfaces are ultimately directed upwardly and in the same direction. Such means may include a light responsive means cooperably associated with an air-jet means whereby the air-jet means is actuated only upon the passage of alternate tile to direct an air blast against such alternate tile to urge such tile to fall in a selected direction. Separated tile bodies not subjected to the air blast are advanced in an upright somewhat inclined position so that they will fall in the direction of inclination after they have reached a selected zone spaced from the separation zone.

The apparatus of the present invention is particularly directed to an improved apparatus for handling separated tile bodies so as to obviate the disadvantages of manual handling of such separated tile bodies and to eliminate hand operations previously required to properly position and feed tile to a glaze spray machine.

The primary object of the present invention therefore is to disclose and provide an apparatus for handling separated tile bodies in a novel manner which eliminates manual handling thereof.

Another object of this invention is to disclose and provide an apparatus for handling stuck and unstuck tile bodies in such a manner that losses due to breakage of tile will be reduced to a minimum and virtually eliminated.

Another object of this invention is to disclose and provide a burner device for such an apparatus which includes means for adjustably positioning the burner device for different size tile.

Still another object of this invention is to disclose and provide mounting means for such a burner device wherein the burner device is movable into and out of operating position and need not be shut off when in inoperative position.

A further object of this invention is to disclose and provide a means for assembling moving tile, which have been alternately permitted to fall in opposite directions transverse to the direction of movement to form two columns advancing in parallel longitudinally offset relation, into a single column or line of tile in end-to-end abutting relation.

A still further object of this invention is to disclose and provide an apparatus for separating and handling fired tile bodies wherein damage to said tile bodies is reduced to a minimum.

Generally speaking, the apparatus of the invention comprises means to sequentially separating each tile from its stuck relation with an adjacent tile at a separation zone and means to rapidly move tile in inclined virtually upright position out of said zone. As the separated tile are so moved a tile-positioning means responsive to the passing of each tile are selectively actuated in this example, so that certain tile are urged in one transverse direction and others are moved in the opposite direction so that two parallel columns of longitudinally offset tile are formed with front faces of each tile directed upwardly. As the two columns of tile are advanced, the columns are merged into a single column of tile in edge abutting relation for advancement into a machine for spraying glaze composition thereon.

Numerous objects and advantages of this invention will be readily apparent to those skilled in the art from the following description and drawings in which an exemplary embodiment of the apparatus is shown.

In the drawings:

Fig. 1 is a top plan view of an appaartus embodying this invention.

Fig. 2 is a side elevational view taken from the right of Fig. 1.

Fig. 3 is a side elevational view taken from the front of Fig. 1.

Fig. 4 is an enlarged top plan view of apparatus at a separation zone at the upper left corner of Fig. 1.

Fig. 5 is a fragmentary enlarged vertical sectional view taken in the plane of line V—V of Fig. 4.

Fig. 6 is a fragmentary enlarged back view of burner means used with the apparatus of Fig. 1 and taken from the left corner of Fig. 1.

Fig. 7 is an enlarged fragmentary view partly in section taken in the planes indicated by line VII—VII of Fig. 6.

Fig. 8 is a fragmentary enlarged top plan view of Fig. 6.

Fig. 9 is a fragmentary enlarged back view of a burner means and associated tile, the view being from a viewpoint similar to that of Fig. 6 and showing adjustment of the nozzle means.

Fig. 10 is a schematic diagram of a control system for the apparatus shown in Fig. 1.

In the production of clay composition tile, a bung of tile bodies in stacked relation may be formed by stacking the tile bodies in face-to-face back-to-back relation, or in face-to-back relation. The face of a tile body normally receives a glaze composition and is the surface which presents a decorative appearance. The back of a tile body is the surface which may be pressed against a bed of cement or adhesive material for securing the tile to a wall or floor surface. The present invention is applicable to handling separated tile bodies whether they are initially stacked in a bung in face-to-face back-to-back, or face-to-back relation and in such a manner that each tile is ultimately positioned in horizontal face-up position and edge-abutting relation with adjacent tile entry for entry into a spraying machine for receiving a glaze compositon.

In this example of the invention, a fired bung 15 of stuck tile bodies or tile 15a, b, c, etc., in face-to-face and back-to-back relation may be transported in any suitable manner to a receiving station R at one end of a feed conveyor means which may include a frame means 16. The frame means 16 may include an elongated rigid frame structure comprising frame legs 17, longitudinal top and bottom frame members 18, and interconnecting horizontal frame members 18a.

The feed conveyor means may include an endless belt means comprising transverse horizontal shafts 19 mounted at opposite ends of the frame means 16 in suitable bearing means 20 carried by adjacent frame legs 17. Each shaft 19 may carry a cylindrical roller or drum 21 outwardly of the end of the frame means 16. An endless conveyor belt 22 of selected width sufficient to accommodate several different widths or sizes of tile may be supported by drums 21 and may extend therebetween so as to provide a top belt lay 23 adapted to transport tile of bung 15. Top lay 23 may be supported for movement in a horizontal plane by a metal plate or sheet 24 extending between drums 21 and carried by top frame members 18. Lower lay 25 of the belt 22 may be suitably tensioned by adjustable idle tensioning rollers 26 carried by the top frame members 18 in longitudinal spaced relation.

Means for driving the top lay 23 of the belt 22 toward a separation zone 27 adjacent one end of frame means 16 may comprise a drive pulley system 28 connected to one of the shafts 19 and to a gear box means 29 carried by bottom frame members 18. The gear box means 29 may be connected to a suitable motor means 30 through clutch means 31.

Means for supporting and guiding the tile of bung 15 on upper lay 23 for advancement from the receiving station R toward the separation zone 27 may include a longitudinally extending upstanding guide panel 33 supported by the frame means at one longitudinal edge of the top belt lay 23. An angle iron member 34 secured to panel 33 may carry a pair of spaced laterally slotted brackets 35 through each of which a bolt means 36 may extend for connection to the adjacent top frame member 18. Guide panel 33 may be thus laterally adjusted relative to the belt 22 and secured in such adjusted position by the brackets 35 and bolt means 36 for accommodating different widths of tile. Tile of bung 15 are supported on top lay 23 lie in parallel planes perpendicular to the axis of advancement of the bung 15 and each tile may have one side edge in sliding contact with guide panel 33 and a bottom edge resting upon the top surface of lay 23. To prevent slippage of the tile with respect to the top lay 23 a follower block or weight 37 may be placed at the trailing end of the bung 15.

Adjacent to separation zone 27 one of the top frame members 18 may be provided with an extension 18a projecting beyond the end of the frame. Extension 18a supports with an extension 34a of member 34 a horizontal plate 38 upon which tile advanced by lay 23 slidably move thereover, said advancing tile being guided by a corresponding extension 33a of guide panel 33. Plate 38 and guide panel 33 may terminate above and adjacent the center line of a conveyor means 40 which may be disposed at right angles to the feed conveyor means and which is for the purpose of rapidly moving separated tile out of the separation zone 27.

Adjacent the separation zone 27 a laterally extending member 41 may be secured to the guide panel 33, said member 41 supporting a resilient longitudinally extending slightly downwardly inclined biased finger element 42 centrally above tile moved along plate 38. Finger element 42 may lightly press against the top edge of a leading tile 15a and serves to urge the leading tile downwardly onto conveyor means 40 immediately upon separation of tile 15a from its adjacent succeeding tile 15b, as more fully later described.

Conveyor means 40 may comprise an elongated rigid frame means 44 including end legs 45 interconnected by suitable horizontal frame members 46. An endless belt 47 having a top lay 48 and a bottom lay 49 may be supported by cylindrical drums 50 carried by shafts 51 supported in bearing means 52 from the frame means 44 adjacent opposite ends thereof. One shaft 51 may be connected to a drive pulley means 53 which may be driven by a suitable motor means 53a carried by the frame means. Belt tensioning means 54 may be connected with the bottom lay 49. Top lay 48 may be supported in a horizontal plane throughout its length by a longitudinally extending plate 55 carried by top frame members 46. As best seen in Fig. 2, the top surface of top lay 48 lies in a horizontal plane slightly below the plane of the top surface of plate 38. Belt 47 may be of a width to permit two laterally spaced columns of tile to be supported on top lay 48.

At the separation zone 27 burner means may be supported from the conveyor frame means 44 in juxtaposed relation to the advancement of the tile of bung 15 along the feed conveyor means. The burner means may include a nozzle means 56 (Figs. 6, 7, 8 and 9) which may be positioned above and extend over top lay 48 of the conveyor means 40. The front end of nozzle means 56 may be spaced from the front edge of plate 38 a predetermined distance so that a selected concentrated amount of heat may be directed against the front surface of leading tile 15a when tile 15a is at the forward edge of plate 38.

The burner means may utilize any suitable heat source such as gas, and in this example, nozzle means 56 is provided with a plurality of nozzle elements 56a arranged to direct a plurality of converging flames against the central surface of the leading tile 15a. Nozzle means 56 may include a cylindrical body 58 terminating in a short cylindrical nozzle portion 59 having its axis parallel to and laterally offset from the axis of body 58, the nozzle portion 59 being connected thereto by an intermediate angularly disposed body portion 60. Nozzle means 56 may be supported by a collar 62 adapted to receive cylindrical body 58 for turning about its longitudinal axis. A pair of spaced rings 63 fixed to the body 58 as by set screws 64 longitudinally positions the collar on the body 58.

Means for selectively rotatably positioning body 58 with respect to its axis may include angularly spaced detents or recesses 71 in body 58 which may be engaged by a downwardly biased detent or holder pin 70. Pin 70 may be carried by collar 62 extending through a port in said collar and through a port in a housing 73 carried by collar 62. A spring 74 within the housing 73 may be seated at one end on a shoulder on the pin 70 and at its other end against the top wall of the housing 73 for biasing the pin downwardly. It will thus be apparent that when pin 70 is lifted upwardly against the biasing spring 74 so that its end may be removed from the detent recesses 71, the body 58 may be rotated about its longitudinal axis to selectively position the nozzles 59 and may then be secured in selected position by engagement of pin 70 with a recess 71.

Means for longitudinally positioning the burner means in selected spaced relation to tile 15a at the front edge of plate 38 may comprise an extension lug 65 on collar 62 provided with a keyed port 65a complementary to a splined slide shaft 66 carried between end plates 67. A nut 120 carried by extension lug 65 threadedly engages a feed screw 121 lying parallel to shaft 66 and rotatably mounted in end plates 67. A crank 122 connected to feed screw 121 may be turned to rotate the feed screw which will produce longitudinal movement of the collar and burner means for adjustably moving the same towards and away from the leading tile 15a.

It will be understood that other means may be used for mounting the burner means for rotation and for movement toward and away from a leading tile 15a. For example, the biased pin 70 may be a set screw or bolt. The body 58 may be provided with an external threaded portion engaged by a transverse worm threaded shaft which may be rotated to longitudinally advance or retract the burner body. Suitable rack and pinion means may also be employed for this purpose.

The end plates 67 are interconnected by a bar 123 to which may be secured the upper end of a burner support arm or lever 68. At its opposite end support arm 68 may be pivotally connected as at 75 to a horizontal frame member of the frame means 44. Between its ends support arm 68 may be pivotally connected as at 76 to one end of a piston rod 77 extending from a double acting fluid or air cylinder 78. The air cylinder 78 may be disposed generally normal to support arm 68 and the end opposite to piston rod 77 may be pivotally connected as at 80 to a frame member 46. The air cylinder may be selectively supplied at opposite ends thereof with compressed air through air hoses 79 connected to a suitable compressed air source through selectively operable valves (not shown).

The burner means shown in full lines in Fig. 6 is operatively positioned for applying heat to tile 15a of bung 15 for separating stuck tile. In phantom lines the burner means is shown in an inoperative position out of alignment with the advancing tile. This change in position of the burner means is accomplished by actuation of the air cylinder 78 so as to move the burner support arm 68 about its pivot at 75 into its inoperative position. It will be noted that in such inoperative position the burner means and nozzle means thereon are directed into a suitable insulated fire-resistant fire box 82 which may be supported by the frame means 44 and which may be provided with a stack 82 for passage of burner gases therethrough upwardly and away from the separation zone 27.

A comparison of Figs. 6 and 9 clearly indicates how rotation of the cylindrical body 58 displaces the axis of the burner flames in such a manner that the flame is properly located with respect to tile of different size. In Fig. 6 a large size tile is illustrated and the offset nozzle portion 59 is disposed with its axis above the axis of the body portion 56 in order that the axis of the burner flame be directed toward the central portion of the leading face of the tile 15a. In Fig. 9 rotation of the cylindrical body 56 through approximately 90° not only positions the axis of the nozzle portion 59 in a somewhat lower position, but also moves said axis laterally so that it is aligned with the central portion of a smaller size tile, as shown in Fig. 9. It will be apparent that intermediate size tile may be accommodated by selectively turning the nozzle body 56 less than 90° in order to properly position the offset nozzle portion 59 with respect to the advancing tile.

It will be understood that the amount of heat and the rate at which the heat is applied to a leading tile body 15a is correlated to the rate of advancement of the tile of bung 15 so that as the leading tile 15a is moved to the edge of plate 38, it will be subjected to heat which causes rapid expansion of tile 15a and thus causing separation of tile 15a from the succeeding tile 15b by cracking or breaking of the bond between the opposed contacting surfaces of tile 15a, 15b. Such separation occurs while tile 15a moves approximately the thickness of the tile, and as the back face of tile 15a clears the front edge of plate 38a and tile 15a drops to the top surface of the top lay 48 of the belt 47. Such method of separation of tile by expansion of one tile is described and claimed in Patent No. 2,829,419.

Conveyor means 40 provides means for rapidly sequentially moving separated tile 15a, 15b, etc. out of the separation zone in upright position and with the bottom edge of each tile resting upon the top lay of belt 47. Separated tile 15a is initially supported in upright position by the succeeding tile 15b and slides laterally thereacross unmasking tile 15b for application of heat thereto as later described.

Means to maintain the separated tile 15a in upright position as it leaves the support of the succeeding tile 15b may include an inclined flat guid plate 87 extending longitudinally of belt 47 and supported from frame extension 18a. The edge of plate 87 proximate to the separation zone is spaced close enough to the advancing tile of bung 15 so as to support a separated tile 15a before the tile is completely unsupported by the succeeding tile 15b. The inclined plane (approximately 10°) of inner surface 88 on plate 87 may lie at or slightly spaced back from the plane along which the trailing face of the separated tile moves out of the separation zone so that each separated tile may be advanced upon surface 88. Plate 87 may be of any suitable length, preferably at least not less than the length of two tile.

In order to minimize the effect of jamming of separated tile if such should occur at the separation zone, as where space is not provided between separated tile and portions of separated tile overlap, means are provided for further facilitating passage of tile along surface 88. Such means may comprise a guide bar 91 disposed at an angle to and spaced from plate 87 to form a relatively wide opening for receiving separated tile in upright position as the tile first advances thereinto. Guide bar 91 may be supported from plate 87 by a pair of longitudinally spaced resilient straps 89 of U-shape, one leg 89a of which is secured to plate 87 and the other leg 90 of which may be secured to bar 91. The U-shaped resilient strap 89 may yield to accommodate more than on tile in partly overlapping relation and may exert a biasing force tending to cause the most advanced tile to direct its leading forward upright edge toward surface 88. If the overlap of tile is not very great, guide bar 91 may facilitate separation of said tile as the tile proceeds along the surface 88 without disturbing the sequential relation of tile being separated. The yielding action of bar 91 which permits the acceptance of jammed tile into the guide means thus serves to allow tile to move out of range of the burner flames.

It will thus be noted that a separated tile is moved along guide surface 88 in inclined position of approximately 10° and that since the tile in bung 15, in this example, are arranged in fact-to-face, back-to-back relation separated tile moving along surface 88 will be arranged with their decorative faces alternately directed in opposite directions. For purposes of explanation, it will be assumed that lead tile 15a has its decorative face directed toward the burner means and upon separation toward the guide bar 91.

Means are provided whereby each tile which has its decorative face facing the same direction as lead tile 15a will fall in one direction and alternate tile which have their decorative faces facing in the opposite direction will fall in the opposite direction, so that all of the tile of bung 15 will be supported by the top lay 48 with their decorative faces directed upwardly. It will be readily apparent that lead tile 15a and succeeding alternate tile having their decorative faces directed in the same direction as tile 15a will upon clearing the surface 88 fall by gravitational forces to the top lay of belt 48 because of the inclination of surface 88.

To urge tile, such as 15b, which have their decorative faces facing the surface 88 in an opposite direction with respect to the faces of tile 15a, means are provided responsive to the passage of separated tile from the support of guide plate 87. In this example, a photoelectric eye means may be employed and may comprise a light source 93 supported at one side of conveyor means 40 and an electric eye 95 supported at the opposite side of the conveyor means 40. Light beam 94 from source 93 may pass through a recess 96 provided in plate 87 so that the beam will be intercepted before a separated tile has moved beyond the support of plate 87. The photoelectric eye means may be responsive to passage of each separated tile.

Air jet means 98 may be supported by conveyor frame means 40 in longitudinally spaced relation to the end of plate 87 at approximately where a separated tile is unsupported for a major portion of its longitudinal dimension by plate 87. Air jet means 98 may include an air nozzle 99 which may be aimed at the upper portion of a separated tile. The photoelectric eye means records the passage of each tile and for alternate tile, such as 15b, causes actuation of a valve means (later described with respect to Fig. 10) in the air jet means which momentarily produces a blast of compressed air from nozzle 99 onto the upper portion of a tile 15b, the air blast being sufficient to blow the tile away from nozzle 99 so that it will fall upon the top lay 48 with its decorative face upwardly directed. The air jet means 98 will not be actuated upon passage of the next tile which will be permitted to fall by gravity toward the nozzle means 99 so that its decorative face will be directed upwardly.

It will thus be readily apparent that means are provided for rapidly moving the tile out of the separation zone, guiding said tile along the approximate center line of the top lay 48 of the belt means, and then causing alternate tile to fall in opposite directions, so that two longitudinal columns of tile are produced on top lay 48. Each separated tile is spaced longitudinally from the adjacent tile and each tile is spaced laterally from the adjacent tile and in general the separated tile in face-up position on top lay 48 may be said to be in echelon formation.

Means are provided for forming said two columns of tile into a single column or line of tile for passage through a spray machine. Such means may comprise a pair of converging belt means 104 supported by the frame means 44 with opposed inner lays 107 disposed in converging relation toward the discharge end of conveyor means 40. Each belt means 104 may be supported by a small diameter pulley 105 at the end adjacent to the separation zone and by a large diameter pulley 106 adjacent the discharge end of the conveyor means 40. Each of pulleys 105 and 106 are so arranged on the frame means 44 that the belt means 104 lie in planes inclined to the horizontal plane top lay 48.

In order to facilitate the converging movement together of the two columns of tile, the inner lays 107 of the belt means 104 may move linearly at a rate slightly greater than the linear movement of the top lay 48. For this purpose, each large pulley 106 may be provided with a downwardly facing annular drive rib 108 provided on the bottom face thereof, said annular drive rib 108 having a diameter less than the pitch diameter of pulley 106. The inclination of the belt means 104 causes drive rib 108 to contact in frictional driving relation the top surface of top lay 48 in such a manner to impart rotation to pulley 106. Since the pitch diameter of pulley 106 is greater than the diameter of the drive rib 108, the circumferential speed of the pulley 106 at the pitch diameter will be greater than the linear speed of the top lay 48 and thus cause the inner lays 107 of the belt means 104 to move at a linear rate of speed greater than that of the top lay 48.

Thus as the two columns of tile are advanced along the top lay 48 and enter the opening between the small diameter pulleys 105, the tile of each column are caused to move gradually sequentially toward the center line of the top lay 48 and to close together into a single column of tile which may emerge in longitudinal spaced relation from between the large diameter pulleys 106.

The resultant single column of separated tile in face-up position may be maintained in alignment by a pair of parallel spaced guide members 110 supported in any convenient manner over the discharge end of the conveyor means 40. As the tile pass between the guide members 110 and from the discharge end of conveyor means 40, they may be moved over a transfer plate 111 onto a spray conveyor means 112 which may include an endless belt 113 of relatively narrow width for advancing and supporting such tile through a spray coating machine, not shown. The conveyor means 112 may be supported from a suitable frame means 114 and an endless belt 113 may be driven at a linear rate of advancement at the top lay thereof which may be slightly less than the speed of linear advancement of belt 47 so that the longitudinally spaced tile may be caused to close up and transversely disposed edges thereof are urged into tight edge abutment, as at 116. It should be noted that the tile are brought into such edge abutment while they remain between the guide members 110, so that lateral displacement thereof is prevented. Thus the tile in the single column on conveyor belt 113 are in longitudinal alignment, in edge abutment, and in face-up relation so as to receive a glaze composition to be sprayed thereon as they pass through a spray machine.

Operation of the above described apparatus of this invention will be made with reference to Fig. 10 which schematically shows an exemplary wiring diagram for automatic or manual operation of the apparatus. It will be understood that other wiring arrangements may be made if desired and that the switch means hereafter referred to may be conveniently located as described on the frame means.

After a bung 15 has been placed on the feed conveyor belt 22 at the receiving station and a follower member 37 has been positioned at the trailing end of the bung 15, line switches 130, 131, 132 and 133 may be closed, selector switches 134 and 135 turned to automatic position and ignition button 136 pressed. Normally, the burner nozzle means 56 is in inoperative position with the nozzle elements 56a thereof directed into the fire box 82 and while the burner is in such inoperative position, the pilot gas valve 137 may be opened and (limit switch 138 being closed by the inoperative positioning of the burner means) a spark will be produced for ignition of a pilot flame. After the pilot flame has been established, the main gas valve 137a may be opened to establish a desired flame and such flame may be maintained by flame rod 137b. The ignition button 136 is then released.

Conveyor 40, upon which tile are properly faced, may then be started by closing switch 139. When switch 141 is closed, the air solenoid 142, which controls the supply of compressed air to the air cylinder 78, will be actuated and the piston rod of the air cylinder 78 will move the burner nozzle means 56 into operating position against normally open limit switch 143. Closing of the limit switch 143 upon operative position of the burner means 56 will actuate the fed conveyor 22 and cause the bung of tile 15 to advance forwardly into the separation zone 27. Thus tile will not be fed to the separation zone unless the conveyor 40 is actuated and the burner means is in operative position.

As the tile advances into separation zone 27 the leading tile 15a is separated from the next tile 15b by rapid expansion of lead tile 15a caused by application of heat thereto, and the tile 15a is pushed off the edge of plate 38 onto the top lay 48 of conveyor 40. Immediately upon contact with the top lay 48, the lead tile 15a is moved transversely of the bung of the tile and rapidly unmasks the advancing succeeding tile 15b for impingement of the flame of the burner means 56 thereon. Lead tile 15a is advanced through the guide means along plate 87 which maintains said tile in upstanding inclined position.

Closing of switches 132 and 133 energized the photoelectric eye light source 95 and the cell 93 as well as the ratchet relay 144. As the lead tile 15a intercepts the light beam of the electric eye source 95, the switch means 144 is closed and, in this example with lead tile 15a having its front face towards the side of conveyor means 40 opposite source 95, the air jet solenoid 145 is not energized because of the position of the ratchet relay to open an air valve (not shown) for permitting the escape of a momentary blast of compressed air against lead tile 15a. Lead tile 15a thus falls towards the air jet means and into face-up position on the belt lay 48. In the event the ratchet relay is not properly positioned, the switch 146 may be jogged in order to properly position the ratchet relay for the desired operation. As the next tile intercepts the light beam of the electric light source 95, the ratchet relay causes energization of the air feed solenoid and a blast of air will be produced so that the succeeding tile 15b as it leaves the guide means in inclined position will be pushed or blown by a blast of air from air jet means 99 into face-up position. Thus tile are alternately permitted to fall and to be blown into face-up position on belt lay 47.

In this example where the bung 15 comprises tile in face-to-face and back-to-back relation, two columns of tile will thus be formed as shown in Fig. 1 and these two columns will be caused to converge into a single compact closed column by the converging accelerated belt means 104 and by the reduction in speed of the spray machine conveyor 113. It will thus be apparent that the bung of tile 15 are rapidly unstuck and are rapidly automatically placed into face-up position for reception of a glaze composition therein.

It should be noted that a bung of tile which may be formed in face-to-back or back-to-face relation may also be conveniently handled by the apparatus of this invention to position each of such tile into face-up position for application of a glaze composition thereon. In the event the bung of tile are stuck with each face directed towards the direction of advancement of the tile, each tile as it is separated will then have its face facing away from the jet nozzle 99. The light beam and the air jet solenoid may be made inoperative by opening switches 132 and 133 so that as tile leave the guide means in inclined position, they will fall into a single line in face-up position. The single line will be urged toward the center of the conveyor means 40 by one of the belt means 104 so that the single line of tile will be advanced between the guide bars 110 and onto the spray machine conveyor 113.

In the event the bung of tile 15 are advanced with each back faces of the tile directed toward the burner means and the back face of each tile is positioned on the side of the tile opposite from the jet means, the ratchet relay may be made inoperative and as each tile intercepts the light beam, the air jet solenoid will be actuated so as to produce successive air blasts to push each tile over into face-up position.

It should be noted that the burner means 56 is held inoperative and cannot be moved into operative position unless it is in position against the limit switch 143 and in such inoperative position the flame is initially directed into the fire box.

When it is desired to stop operation of the machine, the switch 139 may be actuated so as to open the circuit controlling the facing and feed conveyor means and these conveyors will then stop. Likewise the limit switch 143 will be de-energized and this will cause the burner means 56 to move into inoperative position. When the burner means moves into inoperative position, the gas feed is closed.

It will be readily understood that various modifications and changes may be made in the apparatus for handling tile just after they have been separated from stuck relation and all such changes and modifications coming within the scope of the appended claims are embraced thereby.

We claim:

1. An apparatus for separating and handling a plurality of fired tile in face-to-face and back-to-back stuck relation advanced to a separation zone and separated by heat, and a conveyor means to receive and move individual separated tile out of said zone; the combination of: guide means at the separation zone for retaining each separated tile in edgewise upright relation upon separation and holding said tile in upright relation for a selected distance; an air-jet means spaced from the end of said guide means a distance not greater than the width of tile separated; means at the end of the guide means responsive to a passage of a tile; said air-jet means and said responsive means being cooperably connected whereby passage of a tile at the end of said guide means in preselected sequence with respect to other passing tile actuates said air-jet means to direct a burst of air at said selected tile to urge said selected tile into horizontal relation on said conveyor means.

2. An apparatus as stated in claim 1 including means for assembling separated tile in a single row in abutting relation with front surfaces of each separated tile upwardly directed.

3. An apparatus as stated in claim 1 including a burner device; and means for adjustably moving said burner device into and out of said separation zone.

4. In an apparatus for separating and handling advancing fired tile having opposed faces in stuck relation along a path to a separation zone, including a burner device at the separation zone, for applying heat to a leading tile to separate the same from its adjacent tile; the combination of: a conveyor means at the separation zone extending away therefrom to move each separated tile out of said zone including a slightly inclined upright guide plate to retain a separated tile in slightly inclined upright position as it is moved out of said zone; tile-positioning means spaced from the end of the guide means; and intermittently actuated means at the end of said guide means responsive to passage of each separated tile whereby said tile positioning means is intermittently actuated for positioning alternate tiles in one column while allowing intermediate separated tile to fall in the direction of their inclination to form a second parallel column.

5. In an apparatus for separating stuck tile and handling such separated tile including means to advance along a selected pathway, a plurality of upright tile on edge and with faces in stuck relation, the combination of: means to sequentially separate each tile from its stuck relation with a succeeding tile at a separation zone; means to move each separated tile out of and away from the separation zone; means to maintain each separated tile in inclined, virtually upright relation in its movement from said separation zone and for a selected distance; and positioning means for each separated tile including selectively actuable tile pusher means for potioning only certain of said separated tile.

6. An apparatus as stated in claim 5 wherein said tile pusher means includes a fluid under pressure directed against selected tile.

References Cited in the file of this patent

UNITED STATES PATENTS

| | | |
|---|---|---|
| 2,829,419 | Currier | Apr. 8, 1958 |

FOREIGN PATENTS

| | | |
|---|---|---|
| 684,285 | Germany | Nov. 29, 1939 |